(12) United States Patent
Varnhorn et al.

(10) Patent No.: US 7,915,336 B2
(45) Date of Patent: Mar. 29, 2011

(54) CROSSLINKABLE COMPOSITIONS, THERMOPLASTIC ELASTOMERS OBTAINABLE THEREFROM AND THEIR USE

(75) Inventors: Kay Varnhorn, Monheim am Rhein (DE); Jorg Mertinkat, Rosenheim (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 12/394,628

(22) Filed: Feb. 27, 2009

(65) Prior Publication Data
US 2009/0247690 A1    Oct. 1, 2009

(30) Foreign Application Priority Data

Mar. 4, 2008  (DE) .................. 10 2008 012 526
Aug. 18, 2008 (DE) .................. 10 2008 038 279

(51) Int. Cl.
*C08G 18/08* (2006.01)
*C08L 75/00* (2006.01)

(52) U.S. Cl. ...................................... 524/507
(58) Field of Classification Search ............... 524/507
See application file for complete search history.

(56) References Cited

U.S. PATENT DOCUMENTS

| | | | |
|---|---|---|---|
| 4,197,379 A | 4/1980 | Coran et al. | 525/142 |
| 4,937,303 A | 6/1990 | Wolf et al. | 526/212 |
| 5,135,988 A | 8/1992 | Meurer et al. | 525/302 |
| 5,270,377 A * | 12/1993 | Otawa et al. | 524/504 |
| 2006/0128894 A1* | 6/2006 | Nasreddine et al. | 525/178 |
| 2007/0232715 A1* | 10/2007 | Hoffmann et al. | 522/110 |

FOREIGN PATENT DOCUMENTS

| | | |
|---|---|---|
| DE | 41 239 963 | 1/1993 |
| DE | 44 25 944 | 1/1996 |
| EP | 0 510 478 | 10/1992 |
| EP | 1 669 395 | 6/2006 |
| EP | 1 743 918 | 1/2007 |
| EP | 0 865 086 | 6/2008 |

* cited by examiner

*Primary Examiner* — Ling-Siu Choi
*Assistant Examiner* — Hui Chin
(74) *Attorney, Agent, or Firm* — Michael A. Miller

(57) ABSTRACT

Crosslinkable compositions based on polyamide and on α-olefin-vinyl acetate copolymers, where the compositions comprise a crosslinking initiator, and also a co-crosslinking agent, and crosslinkable compositions based on polyamides and on α-olefin-vinyl acetate copolymers, where these compositions comprise a crosslinking initiator and the amount of polyamide in the compositions is <30% by weight. The present invention further relates to the preparation of the crosslinkable compositions of the invention, to the use of the crosslinkable compositions of the invention for the production of thermoplastic elastomers, to a process for the crosslinking of the compositions of the invention to give a thermoplastic elastomer, and also to the thermoplastic elastomers themselves and to their use for the production of mouldings.

19 Claims, No Drawings

CROSSLINKABLE COMPOSITIONS, THERMOPLASTIC ELASTOMERS OBTAINABLE THEREFROM AND THEIR USE

FIELD OF THE INVENTION

The present invention relates to crosslinkable compositions based on polyamide and on α-olefin-vinyl acetate copolymers, where the compositions comprise a crosslinking initiator, and also a co-crosslinking agent, and crosslinkable compositions based on polyamides and on α-olefin-vinyl acetate copolymers, where these compositions comprise a crosslinking initiator and the amount of polyamide in the compositions is <30% by weight. The present invention further relates to the preparation of the crosslinkable compositions of the invention, to the use of the crosslinkable compositions of the invention for the production of thermoplastic elastomers, to a process for the crosslinking of the compositions of the invention to give a thermoplastic elastomer, and also to the thermoplastic elastomers themselves and to their use for the production of mouldings.

BACKGROUND OF THE INVENTION

In plastics technology, a distinction is traditionally made between three significant classes of materials, namely thermoplastics, elastomers and thermosets. In recent years, a further class of materials, the thermoplastic elastomers, has continually found new applications. Thermoplastic elastomers combine the processing properties of thermoplastics with the service properties of elastomers. The person skilled in the art is aware of various classes of these thermoplastic elastomers. A distinction can be made between two main classes, namely block copolymers (also multiblock copolymers) and elastomer alloys.

The block copolymers are composed of a hard phase and of a soft, elastic phase. The soft phases mostly form the matrix while the hard phases provide a disperse phase which acts like a crosslinking/reinforcing filler. The crosslinking regions are formed via physical bonds between the hard segments. Within their service temperatures, the block copolymers behave like crosslinked elastomers, as long as the transition temperature of the hard segments is markedly above, and that of the soft segments is markedly below, the service temperature, and the fractions in the mixture also have the correct ratio to one another.

Elastomer alloys are polymer blends which comprise thermoplastic fractions and elastomer fractions. They are produced via intensive mixing of the starting components, and crosslinking agents can be added here. If the soft phase is (to some extent) crosslinked, the term used is thermoplastic vulcanizates (TPE-V). If the soft phase has not been crosslinked, the term used is TPE-O.

The present invention relates to thermoplastic elastomers of TPE-V type. The thermoplastic used here comprises at least one polyamide.

TPE-V which have at least one polyamide as thermoplastic are known in the prior art. By way of example, EP 1 801 162 A1 relates to polyamide-EVA mixtures which have from 30 to 80% by weight of a polyamide as thermoplastic matrix, and, coupled to the thermoplastic matrix, a crosslinked disperse elastomer phase comprising from 10 to 69% by weight of an ethylene copolymer, and also from 1 to 10% by weight of a compatibilizer selected from the compounds obtained by means of grafting of α,β-ethylenically unsaturated mono- and/or dicarboxylic acids or their derivatives onto a main polymer chain provided by an ethylene copolymer, in each case based on the moulding composition. According to EP 1 801 162 A1, the intention is to provide thermoplastic moulding compositions which have good physical properties, in particular with reference to oil swelling, without any disadvantageous effect on the impact resistance, breaking stress, modulus of elasticity and tensile strain at break of the moulding composition. According to EP 1 801 162 A1, this is achieved by using from 1 to 10% by weight of a specific compatibilizer. EP 1 801 162 A1 reveals that novel thermoplastic moulding compositions are provided which have high polyamide content, namely from 30 to 80% by weight, preferably from 40 to 60% by weight, particularly preferably from 45 to 55% by weight. There is no description of the reversible elastic properties that are decisive for elastomeric materials, examples being recovery after tensile strain, or compression set.

U.S. Pat. No. 4,197,379 relates to elastoplastic compositions composed of a rubber and polyamide. The compositions have up to 50% by weight of a thermoplastic, crystalline polyamide and up to 80% by weight of a rubber, preferably of a nitrile rubber. According to U.S. Pat. No. 4,197,379 it is essential that the thermoplastic elastomers provided are essentially free from phenolic plasticizers with low molecular weight. U.S. Pat. No. 4,197,379 does not mention the use of α-olefin-vinyl acetate copolymers as elastomer component.

U.S. Pat. No. 5,270,377 relates to polyamide, mixed with a specific, to some extent crosslinked grafted polyolefin elastomer. According to U.S. Pat. No. 5,270,377 the intention is to provide compositions which have good oil resistance, mechanical strength, and heat resistance, if the elastomer component is the main component, and which have excellent impact resistance, stiffness and tensile strength if the polyamide component is the main component. U.S. Pat. No. 5,270,377 does not mention the use of α-olefin-vinyl acetate copolymers as elastomer component.

DE 44 25 944 relates to thermoplastic elastomer compositions which have from 5 to 60% by weight of a thermoplastic phase, where the thermoplastic can inter alia be a polyamide, and from 40 to 95% by weight of a crosslinked ethylene-vinyl ester copolymer or of a crosslinked grafted ethylene-vinyl ester graft copolymer. According to DE 44 25 944, the thermoplastic elastomer compositions are prepared by mixing the thermoplastic with previously crosslinked ethylene-vinyl ester polymer. No dynamic crosslinking of the elastomer component takes place during the mixing with the thermoplastic component.

It is an object of the present invention, in the light of the thermoplastic elastomers known in the prior art, to provide thermoplastic elastomers which feature a rubber-like property profile. This means that the intention is to provide thermoplastic elastomers, and compositions for the production of thermoplastic elastomers, where these have very good recovery properties, good tension set, good compression set, very good heat resistance values and solvent resistance values, and a low range of hardness (Shore hardness A). The thermoplastic elastomers are intended to be capable of processing via any desired processing techniques, such as extrusion, injection moulding, and also blow moulding.

None of the thermoplastic elastomers known hitherto can achieve a combination of properties comprising low hardness, good elastic properties, and rapid recovery together with solvent resistance and heat resistance. The thermoplastic elastomers known hitherto can either achieve good elastic properties or good heat resistance values, but with unsatisfactory solvent resistance values (in particular long-term solvent resistance values), or can achieve good solvent resistance values, but with unsatisfactory heat resistance values. Thermoplastic elastomers which have high heat resistance values and good solvent resistance values, such as TPE-A (polyetheramides), TPE-E (polyetheresters) and TPE-U (TPU, polyurethanes) are available only for applications in the (high) Shore D hardness range, in a high price segment, and have moderate elastic properties. None of the materials known hitherto in the thermoplastic elastomers (thermoplastic vulcanizates) class, TPE-V, has hitherto been capable of complying with the abovementioned requirements profile.

SUMMARY OF THE INVENTION

The object is achieved via provision of crosslinkable compositions according to embodiment 1 comprising
a) from 5 to 50% by weight, preferably from 10 to 40% by weight, particularly preferably from 10 to <30% by weight, of at least one polyamide, as component A;
b) from 20 to 95% by weight, preferably from 40 to 89.5% by weight, particularly preferably from >55 to 85% by weight, of at least one α-olefin-vinyl acetate copolymer, as component B;
c) from 0 to 30% by weight, preferably from 0.5 to 20% by weight, particularly preferably from 5 to 15% by weight, of filler materials, plasticizers, additives and/or additions, as component C;
where the entirety of components A, B and C is 100% by weight,
and
d) from 0.2 to 10 parts by weight per 100 parts by weight of the α-olefin-vinyl acetate copolymer (phr), preferably from 1 to 6 phr, particularly preferably from 1.5 to 6 phr, of at least one free-radical crosslinking initiator, as component D; and
e) from 0.2 to 10 parts by weight per 100 parts by weight of the α-olefin-vinyl acetate copolymer (phr), preferably from 1 to 6 phr, of at least one co-crosslinking agent, as component E.

Alternative crosslinkable compositions of the invention according to embodiment 2 comprise:
a) from 10 to <30% by weight, preferably from 10 to 25% by weight, of at least one polyamide, as component A;
b) from >50 to 90% by weight, preferably from 60 to 89.5% by weight, of at least one α-olefin-vinyl acetate copolymer, as component B;
c) from 0 to 20% by weight, preferably from 0.5 to 15% by weight, of filler materials, plasticizers, additives and/or additions, as component C;
where the entirety of components A, B and C is 100% by weight,
and
d) from 0.2 to 10 parts by weight per 100 parts by weight of the α-olefin-vinyl acetate copolymer (phr), preferably from 1 to 6 phr, particularly preferably from 1.5 to 6 phr, of at least one free-radical crosslinking initiator, as component D; and
e) from 0 to 10 parts by weight per 100 parts by weight of the α-olefin-vinyl acetate copolymer (phr), preferably from 1 to 6 phr, of at least one co-crosslinking agent, as component E.

DETAILED DESCRIPTION OF THE INVENTION

The compositions of the invention are suitable for the production of thermoplastic elastomers which feature not only excellent heat resistance and excellent solvent resistance but in particular also very good elastic properties, with a wide range of hardness.

Particularly suitable compositions of the invention have by way of example a tensile set of <40% at room temperature for 100% tensile strain, a tensile set of <80% at 100° C. for 50% tensile strain; <10% swelling on storage in engine oil for 24 h, and a range of hardness of from 50 to 90 (Shore hardness A). (The examples below mention suitable test methods).

In the case of the former compositions (embodiment 1), this is in particular achieved by the use in these not only of the free-radical crosslinking initiator used as component D, preference being given here to use of a free-radical crosslinking initiator suitable for high crosslinking temperatures, but also of at least one co-crosslinking agent, as component E. The result is a marked improvement in elastic properties, particularly the compression set, of the thermoplastic elastomers produced from the compositions, when comparison is made with compositions which comprise no co-crosslinking agent.

In the case of the latter compositions (embodiment 2), it is essential that these comprise a high proportion of the α-olefin-vinyl acetate copolymer (component B) in relation to the at least one polyamide (component A). These compositions therefore feature—as do the former compositions—very good heat resistance and very good solvent resistance, and also in particular at the same time excellent reversible elastic properties, with a low range of hardness (Shore A hardness).

Thermoplastic elastomers produced from the compositions of the invention can be processed by means of extrusion, or injection moulding, or else by means of blow moulding.

Component A: at Least One Polyamide

In a first embodiment, the amount used of the at least one polyamide in the crosslinkable compositions of the invention is from 5 to 50% by weight, preferably from 10 to 40% by weight, particularly preferably from 10 to <30% by weight, based on the entirety of components A, B (at least one α-olefin-vinyl acetate copolymer) and C (filler materials, plasticizers, additives and/or additions). In the second embodiment according to the present invention, the crosslinkable compositions of the invention comprise from 10 to <30% by weight, preferably from 10 to 25% by weight, of at least one polyamide, as component A, based on the entirety of components A, B and C.

Polyamides suitable as component A are homo- or copolymers which contain, in the main chain of the polymer, monomer units linked by way of amide bonds (—C(=O)—NH—). Preference is given to use of polyamides based on $C_6$–$C_{12}$ lactams or ω-aminocarboxylic acids having from 4 to 18 carbon atoms, preferably from 6 to 12 carbon atoms, or of a polycondensate obtainable from the polycondensation of at least one diamine, from the group consisting of aliphatic diamines having from 4 to 18 carbon atoms and of cycloaliphatic diamines having from 7 to 22 carbon atoms, with at least one dicarboxylic acid selected from the group consisting of aliphatic dicarboxylic acids having from 4 to 44 carbon atoms, of cycloaliphatic dicarboxylic acids having from 8 to 24 carbon atoms, and of aromatic dicarboxylic acids having from 8 to 20 carbon atoms.

Suitable ω-aminocarboxylic acids or lactams are ε-aminocaproic acid, 11-amino-undecanoic acid, 12-aminododecanoic acid, ε-caprolactam, ethanolactam and lauro-lactam, and also mixtures thereof. Examples of suitable diamines that can be combined with a dicarboxylic acid are 2,2,4- or 2,4,4-trimethylhexamethylenediamine, 1,3- or 1,4-bis(aminomethyl)cyclohexane, bis(3-methyl-4-aminocyclohexyl)methane, bis(aminocyclohexyl)methane, m- or p-xylylenediamine, 1,4-diaminobutane, 1,5-diamino-2-methylpentane, 1,6-diaminohexane, 1,8-diaminooctane, 1,9-diaminononane, 2-methyl-1,8-diaminooctane, 1,10-diaminodecane and 1,12-diamino-dodecane. Suitable dicarboxylic acids are succinic acid, glutaric acid, adipic acid, suberic acid, pimelic acid, azelaic acid, sebacic acid, dodecanedicarboxylic acid, octadecanedicarboxylic acid, 4-cyclohexanedicarboxylic acid, terephthalic acid, isophthalic acid and naphthalenecarboxylic acids.

For the purposes of the present invention, the term polyamides also includes polyamide block copolymers which contain polyester segments, polyether segments, polysiloxane segments, polycarbonate segments, polyacrylate segments, polymethacrylate segments and/or polyolefin segments as further components alongside polyamide units. The proportion of polyamide units in the polyamides according to the present invention is generally at least 20% by weight. Examples of polyamide block copolymers are polyetheramides, polyetheresteramides, and also polyesteramides.

Particularly preferred polyamides are those selected from the group consisting of polycaprolactam (nylon-6), polylaurolactam (nylon-12), polyhexamethyleneadipamide (nylon-6,6), polyhexamethyleneazelamide (nylon-6,9), polyhexamethylenesebacamide (nylon-6,10), polyhexamethyleneisophthalamide (nylon-6,IP), polyaminoundecanoic acid (nylon-11), polytetramethyleneadipamide (nylon-4,6), and also copolymers of caprolactam, hexamethylenediamine and adipic acid (nylon-6,66) and aramids, such as polyparaphenyleneterephthalamide.

Preferred polyamides have softening or melting points in the range from 120 to 320° C., preferably in the range from 180 to 300° C., particularly preferably in the range from 200 to 280° C. To obtain thermoplastic elastomers which can be used at particularly high temperatures it is preferable that the polyamides used as component A comprise those having high melting and/or softening points. The polyamides are moreover preferred and are crystalline or semicrystalline.

Component A in the crosslinkable compositions of the invention can involve one polyamide or a mixture composed of two or more different polyamides.

The polyamides suitable as component A in the crosslinkable compositions of the invention can be prepared according to processes known to the person skilled in the art, or are available commercially. The definition of component A applies not only to the crosslinkable compositions according to embodiment 1 but also to the crosslinkable compositions according to embodiment 2.

Component B (α-olefin-vinyl Acetate Copolymer)

The amount used of the α-olefin-vinyl acetate copolymer (component B) in the crosslinkable compositions of the invention according to embodiment 1 is from 20 to 95% by weight, preferably from 40 to 89.5% by weight, particularly preferably from >55 to 85% by weight, based on the entirety of components A, B and C. The amount used of component B in the compositions of the invention according to embodiment 2 is from >50 to 90% by weight, preferably from 60 to 89.5% by weight, based on the entirety of components A, B and C.

The α-olefin-vinyl acetate copolymers used as component B can generally have vinyl acetate contents of from 20 to 98% by weight.

The α-olefin-vinyl acetate copolymers used with preference according to the invention feature high vinyl acetate contents of $\geqq$40% by weight, based on the total weight of the α-olefin-vinyl acetate copolymer, preferably vinyl acetate contents of $\geqq$50% by weight, based in each case on the total weight of the α-olefin-vinyl acetate copolymers. It is usual that the vinyl acetate content of the α-olefin-vinyl acetate copolymers used according to the invention is from $\geqq$40% by weight to 98% by weight, preferably from $\geqq$50% by weight to 98% by weight, and that the α-olefin content is from 2% by weight to $\leqq$60% by weight, preferably from 2% by weight to $\leqq$50% by weight, where the total amount of vinyl acetate and α-olefin is 100% by weight.

The α-olefin-vinyl acetate copolymer used according to the invention can comprise not only the monomer units based on the α-olefin and on vinyl acetate, but also one or more further comonomer units (e.g. terpolymers), e.g. based on vinyl esters and/or on (meth)acrylates. The proportion of the further comonomer units—if indeed further comonomer units are present in the α-olefin-vinyl acetate copolymer—is up to 10% by weight, based on the total weight of the α-olefin-vinyl acetate copolymer, whereupon the proportion of the monomer units based on the α-olefin decreases correspondingly. It is therefore possible by way of example to use α-olefin-vinyl acetate copolymers which are composed of from $\geqq$40% by weight to 98% by weight of vinyl acetate, from 2% by weight to $\leqq$60% by weight of α-olefin, and from 0 to 10% by weight of at least one further comonomer, where the total amount of vinyl acetate, α-olefin and the further comonomer is 100% by weight.

α-Olefins that can be used in the α-olefin-vinyl acetate copolymers used according to the invention are any of the known α-olefins. It is preferable that the α-olefin has been selected from ethene, propene, butene, in particular n-butene and isobutene, pentene, hexene, in particular 1-hexene, heptene, in particular 1-heptene, and octene, in particular 1-octene. It is also possible to use higher homologues of the α-olefins mentioned as α-olefins in the α-olefin-vinyl acetate copolymers used according to the invention. The α-olefins can moreover bear substituents, in particular $C_1$-$C_5$-alkyl moieties. However, it is preferable that the α-olefins bear no further substituents. It is moreover possible to use mixtures of two or more different α-olefins in the α-olefin-vinyl acetate copolymers used according to the invention. However, it is preferable not to use mixtures of different α-olefins. Preferred α-olefins are ethene and propene, and it is particularly preferable here to use ethene as α-olefin in the α-olefin-vinyl acetate copolymers used according to the invention. The α-olefin-vinyl acetate copolymer preferably used in the crosslinkable compositions of the invention therefore involves an ethylene-vinyl acetate copolymer.

Particularly preferred ethylene-vinyl acetate copolymers have a vinyl acetate content of from $\geqq$40% by weight to 98% by weight, preferably from $\geqq$50% by weight to 98% by weight, and an ethylene content of from 2% by weight to $\leqq$60% by weight, preferably from 2% by weight to $\leqq$50% by weight, where the entirety of vinyl acetate and ethylene is 100% by weight.

The α-olefin-vinyl acetate copolymer used according to the invention, preferably ethylene-vinyl acetate copolymer, is preferably prepared by a solution polymerization process at a pressure of from 100 to 700 bar, preferably at a pressure of 100 to 400 bar. The solution polymerization process is preferably carried out at temperatures of from 50 to 150° C., generally using free-radical initiators.

The ethylene-vinyl acetate copolymers preferably used according to the invention and having high vinyl acetate contents are usually termed EVM copolymers, where the "M" in the name indicates the saturated main methylene chain of the EVM.

Suitable preparation processes for the α-olefin-vinyl acetate copolymers used according to the invention are mentioned by way of example in EP-A-0 341 499, EP-A 0 510 478 and DE-A 38 25 450.

The α-olefin-vinyl acetate copolymers which are used with preference according to the invention and have high vinyl acetate contents, and are prepared by the solution polymerization process at a pressure of from 100 to 700 bar in particular feature low degrees of branching and low viscosities. The α-olefin-vinyl acetate copolymers used according to the invention moreover have a uniformly random distribution of their units (α-olefin and vinyl acetate).

The MFI values (g/10 min), measured to ISO 1133 at 190° C. using a load of 21.1 N, of the α-olefin-vinyl acetate copolymers used according to the invention, preferably ethylene-vinyl acetate copolymers, is generally from 1 to 40, preferably from 1 to 10, particularly preferably from 2 to 6.

The Mooney viscosities to DIN 53 523 ML 1+4 at 100° C. are generally from 3 to 50, preferably from 4 to 35, Mooney units.

It is particularly preferable that the crosslinkable compositions according to the invention use ethylene-vinyl acetate copolymers, where these are by way of example commercially available with trade mark Levapren® or Levamelt® from Lanxess Deutschland GmbH. α-Olefin copolymers whose use is particularly preferred are the ethylene-vinyl acetate copolymers Levamelt® 400, Levamelt® 450, Levamelt® 452, Levamelt® 456, Levamelt® 500, Levamelt® 600, Levamelt® 700, Levamelt® 800 and Levamelt® 900, having 60±1.5% by weight of vinyl acetate, 70±1.5% by weight of vinyl acetate, 80±2% by weight of vinyl acetate, and, respectively, 90±2% by weight of vinyl acetate, and the corresponding Levapren® grades.

Component B used in the crosslinkable compositions of the invention can comprise one α-olefin-vinyl acetate copolymer, but it is likewise possible to use mixtures composed of two or more α-olefin-vinyl acetate copolymers.

The above statements relating to component B also apply to the crosslinkable compositions according to embodiment 1 and to the crosslinkable compositions according to embodiment 2.

Component C (Filler Materials, Plasticizers, Additives and/or Additions)

The crosslinkable compositions of the invention according to embodiment 1 can comprise from 0 to 40% by weight, preferably from 0.5 to 30% by weight, particularly preferably from 5 to 20% by weight, based on the entirety of components A, B and C, of filler materials, plasticizers, additives and/or additions, as component C. The crosslinkable compositions according to embodiment 2 can comprise from 0 to 30% by weight, preferably from 0.5 to 20% by weight, based on the entirety of components A, B and C, of filler materials, plasticizers, additives and/or additions, as component C.

In principle, the person skilled in the art is aware of suitable filler materials, plasticizers, additives and/or additions. Examples of suitable filler materials, plasticizers, additives and additions are mentioned below:

Filler Materials (Fillers)

Examples of suitable filler materials are carbon black, chalk (calcium carbonate), kaolin, siliceous earth, talc (magnesium silicate), aluminium oxide hydrate, aluminium silicate, calcium carbonate, magnesium carbonate, calcium silicate, magnesium silicate, barium sulphate, zinc carbonate, calcined kaolin (e.g. Polestar® 200 P), calcium oxide, magnesium oxide, titanium oxide, aluminium oxide, zinc oxide, silanized kaolins, silanized silicate, coated chalk, treated kaolins, fumed silica, hydrophobicized fumed silica (e.g. Aerosil® 972), synthetic, amorphous precipitated silica, industrial carbon black, graphite, nanoscale fillers, such as carbon nanofibrils, lamellar nanoparticles, or nanoscale silicon dioxide hydrates and minerals.

Plasticizers

Examples of suitable plasticizers are ester plasticizers, e.g. phthalic esters, such as dioctyl phthalate, diisooctyl phthalate, dinonyl phthalate, diisodecyl phthalate; aliphatic esters, such as dioctyladipate, dioctyl sebacate; phosphoric esters, such as tricresyl phosphate, diphenyl cresyl esters, trioctyl phosphate; polyesters, such as polyphthalic esters, polyadipic esters, polyesterethers (e.g. ADK Cizer RZ-700, ADK Cizer RZ-750) and trimellitates (e.g. BISOFLEX® T810T).

Additives and Additions

Examples of suitable additives and additions are processing aids, metal soaps, fatty acids and fatty acid derivatives, factice (rubbery substance obtained for example by treating drying oils with sulphur or sulphur chloride; serves as rubber extender), ageing stabilizers, UV stabilizers or ozone stabilizers, such as ozone-stabilizer waxes, antioxidants, e.g. polycarbodiimides (e.g. Rhenogran® PCD-50), substituted phenols, substituted bisphenols, dihydroquinolines, diphenylamines, phenylnaphthylamines, paraphenylenediamines, benzimidazoles, paraffin waxes, microcrystalline waxes, pigments and dyes, such as titanium dioxide, lithopones, zinc oxide, iron oxide, ultramarine blue, chromium oxide, antimony sulphide; other stabilizers, e.g. heat stabilizers, weathering stabilizers; oxidation stabilizers, e.g. p-dicumyldiphenylamine (e.g. Naugard® 445), styrenated diphenylamine (e.g. Vulcanox® DAA), zinc salt of methylmercaptobenzimidazole (e.g. Vulcanox® ZMB2), polymerized 1,2-dihydro-2,2,4-trimethylquinoline (e.g. Vulcanox® HS), thiodiethylene bis(3,5-di-tert-butyl-4-hydroxy) hydrocinnamate, thiodiethylene bis[3-(3,5-di-tert-butyl-4-hydroxyphenyl)propionate] (e.g. Irganox® 1035), lubricants, mould-release agents, flame retardants, adhesion promoters, marking substances, minerals, and crystallization accelerators and crystallization retardants.

Component D (Free-Radical Crosslinking Initiator)

The crosslinkable compositions of the invention moreover comprise—not only according to embodiment 1 but also according to embodiment 2—from 0.2 to 10 parts by weight per 100 parts by weight of the α-olefin-vinyl acetate copolymer (component B) (phr), preferably from 1 to 6 phr, particularly preferably from 1.5 to 6 phr, of at least one free-radical crosslinking initiator, as component D.

For free-radical crosslinking which provides the desired elastomeric properties of the thermoplastic elastomers obtainable from the compositions of the invention, high doses of free-radical crosslinking initiator are particularly preferred, in order to achieve high degrees of crosslinking. While it is possible to achieve oil swelling of thermoplastic moulding compositions even at low degrees of crosslinking and therefore using small amounts of free-radical crosslinking initiator and/or without use of any co-crosslinking agent, thermoplastic elastomers of the invention with particularly good elastomer properties are obtained in the presence of relatively large amounts of at least one free-radical crosslinking agent and/or of at least one free-radical crosslinking agent together with a co-crosslinking agent.

The person skilled in the art is aware of suitable free-radical crosslinking initiators. Examples of suitable crosslinking initiators are organic peroxides, e.g. alkyl and aryl peroxides, alkyl peresters, aryl peresters, diacyl peroxides, polyvalent peroxides, such as 2,5-dimethyl-2,5-di(tert-butylperoxy)hex-3-yne, (e.g. Trigonox® 145-E85, Trigonox® 145-45B), di-tert-butyl peroxide, (e.g. Trigonox® B), 2,5-dimethyl-2,5-di(tert-butylperoxy)hexyne, (e.g. Trigonox® 101), tert-butyl cumyl peroxide (e.g. Trigonox® T), di(tert-butylperoxyisopropyl)benzene (e.g. Perkadox® 14-40), dicumyl peroxide (e.g. Perkadox® BC 40), benzoyl peroxide, 2,2'-bis(tert-butylperoxy)diisopropylbenzene (e.g. Vulcup® 40 AE), 2,3,5-trimethyl-2,5-di(benzoyl-peroxy)

hexane and (2,5-bis(tert-butylperoxy)-2,5-dimethylhexane, 3,3,5,7,7-pentamethyl-1,2,4-trioxepane (e.g. Trigonox® 311).

One important property of free-radical crosslinking initiators, particularly of crosslinking peroxides, is the generation of free radicals, this property generally being described via the half life time [t ½]. The half life time is the time at which, at a certain temperature, the concentration of a free-radical crosslinking initiator present is 50% of the initial concentration.

The half life times are determined by way of the vulcanization curves. The half life time becomes shorter as temperature rises. It is preferable to use peroxides whose half life time above the melting or softening point of component A is sufficiently long that they retain capability for homogeneous incorporation into the polymer melt. It is preferable to use peroxides whose half life time is below the residence time in the corresponding mixing assembly, in order that all of the free radicals generated can be consumed for the crosslinking reaction.

Because of the high melting or softening point of the polyamide used according to the invention as component A, the crosslinking of the elastomer phase for the production of the thermoplastic elastomers obtainable from the compositions of the invention takes place in an appropriately hot melt. This demands—in one preferred embodiment—the use of free-radical crosslinking initiators, preferably peroxides, with sufficiently long half life time. Free-radical crosslinking initiators, preferably peroxides, with short half life times at low temperatures decompose on first contact with the polymer melt and are not incorporated homogeneously, and give inadequate or inhomogeneous crosslinking of the elastomer phase. It is therefore particularly preferable according to the invention to use free-radical crosslinking initiators, preferably peroxides, which have adequately long half life times at ≧175° C., particularly preferably ≧180° C., very particularly preferably ≧185° C., with particular preference ≧190° C. and more particularly preferably ≧200° C. It is particularly preferable to use 3,3,5,7,7-pentamethyl-1,2,4-trioxepane, obtainable commercially for example with trade name Trigonox® 311, in the crosslinkable compositions of the invention.

Component E (Co-Crosslinking Agent)

The amount used of the co-crosslinking agent in the compositions of the invention according to embodiment 1 of the present invention is from 0.2 to 10 parts by weight per 100 parts by weight of the α-olefin-vinyl acetate copolymer (phr), preferably from 1 to 6 phr. The amount of the co-crosslinking agent used in the crosslinkable compositions of the invention according to embodiment 2 is from 0 to 10 parts by weight per 100 parts by weight of the α-olefin-vinyl acetate copolymer (phr), preferably from 1 to 6 phr.

Surprisingly, it has been found that the elastic properties, in particular the compression set, of thermoplastic elastomers which are produced from the crosslinkable compositions of the invention can be improved via addition of a co-crosslinking agent within the crosslinkable compositions without impairment of the abovementioned elastic properties and of the heat resistance and solvent resistance values. The compression set, in particular, can be substantially improved via addition of a co-crosslinking agent within the crosslinkable compositions of the invention, within the industrially relevant range. The prior art gives no indication that the use of a co-crosslinking agent in crosslinkable compositions according to the present invention can achieve an improvement in the elastic properties, in particular in the compression set. Addition of a co-crosslinking agent can moreover reduce the amount of crosslinking agent in comparison with the amount usually used of crosslinking agent, without any impairment of the property profile of the products obtained.

Examples of suitable co-crosslinking agents are those selected from the group consisting of triallyl isocyanurate (TAIC), e.g. obtainable commercially as DIAK7 from DuPont, N,N'-m-phenylenedimaleimide, e.g. obtainable commercially as HVA-2® (DuPont Dow), triallyl cyanurate (TAC), liquid polybutadiene, e.g. obtainable as Ricon® D153 from Ricon Resins, trimethylolpropane-N,N'-m-phenylenemaleimide, N-methyl-N,N'-m-phenylenedimaleimide, divinylbenzene, polyfunctional methacrylate monomers, such as ethylene glycol dimethacrylate, diethylene glycol dimethacrylate, polyethylene glycol dimethacrylate, trimethylolpropane trimethacrylate and allyl methacrylate, and polyfunctional vinyl monomers, such as vinyl butyrate and vinyl stearate.

Co-crosslinking agents whose use is preferred are those selected from the group consisting of triallyl isocyanurate (TAIC), N,N'-m-phenylenedimaleimide, triallyl cyanurate (TAC) and liquid polybutadiene. It is particularly preferable to use triallyl isocyanurate (TAIC) as co-crosslinking agent.

It is possible to use one co-crosslinking agent or two or more co-crosslinking agents together in the crosslinkable compositions of the invention (both according to embodiment 1 and according to embodiment 2).

Component F (Compatibilizer)

The crosslinkable compositions of the invention, both according to embodiment I and according to embodiment 2, can also comprise at least one compatibilizer as component F, alongside the abovementioned components A to E, of which some are optional. The compatibilizer generally improves the coupling of the α-olefin-vinyl acetate copolymer (component B) to the polyamide (component A). The person skilled in the art is in principle aware of suitable compatibilizers. By way of example, functionalized polyolefins and, respectively, polyolefin copolymers are suitable compatibilizers. Suitable functional groups of the functionalized polyolefins or polyolefin copolymers are carboxy groups, carbonyl groups, halogen atoms, amino groups, hydroxy groups or oxazoline groups. It is preferable that the polyolefins or polyolefin copolymers have been functionalized with carboxy groups. Production processes for suitable polyolefins functionalized with carboxy groups are disclosed by way of example in DE 41 23 963 and in the references mentioned therein.

It is preferable that the compatibilizer in the compositions according to embodiments 1 and 2 of the present invention is a copolymer based on an α-olefin-vinyl acetate copolymer as main polymer chain, functionalized with carboxy groups, carbonyl groups, halogen atoms, amino groups, hydroxy groups or oxazoline groups, preferably with carboxy groups. The compositions of the invention particularly preferably use a compatibilizer which is obtained by means of grafting of α,β-ethylenically unsaturated mono- and/or dicarboxylic acids or their derivatives onto a main chain provided by an α-olefin-vinyl acetate copolymer. Suitable processes for the preparation of the particularly preferred compatibilizer are known to the person skilled in the art and mentioned by way of example in EP 1 801 162 A1. The compositions of the invention have particularly good oil-swelling behaviour in particular when α-olefin-vinyl acetate copolymers, in particular ethylene-vinyl acetate copolymers, particularly preferably EVM having high vinyl acetate contents, generally ≧60% by weight, are grafted.

The amount used of the abovementioned compatibilizer in the crosslinkable compositions of the invention according to embodiments 1 and 2, if indeed it is present at all, is from 0 to 50% by weight, based on the entirety of components A, B and C, preferably from 3 to 40% by weight, particularly preferably from 5 to 30% by weight.

Preparation of the Crosslinkable Compositions of the Invention and Crosslinking to Give Thermoplastic Elastomers (TPE-V)

The crosslinkable compositions of the invention can be prepared via mixing of components A, B, C, D, E and F—to the extent that they are present in the compositions. The mixing process here can use mixing systems known in rubber technology, examples being internal mixers, e.g. internal mixers with intermeshing or tangential rotor geometry, or continuous mixing systems, such as mixing extruders, e.g. mixing extruders having from 2 to 4 screws.

In carrying out the process of the invention, it is important to ensure that the mixing temperature is sufficiently high that component A is converted to the plastics state without being damaged. This is ensured if the temperature selected is above the highest melting or softening point of component A. It is particularly preferable that components A, B, C, D, E and F—to the extent that they are present in the compositions—are mixed at a temperature in the range which is generally from 150 to 350° C., preferably from 150 to 280° C.

Various variants are in principle possible for the mixing of the individual components.

In a first variant, components A and B, and, if appropriate, components C and F, to the extent that they are present in the compositions of the invention, are used as initial charge and intimately mixed at temperatures above the highest melting or softening point of component A. Components D and E (to the extent that component E is present in the compositions of the invention) are then added, with continuation of the mixing process and retention of the abovementioned mixing temperature.

In a second embodiment of the process of the invention, component B is used as initial charge and heated to a temperature up to just below the melting or softening point of component A. Component A is then added, and the temperature is increased to a temperature above the highest melting or softening point of component A, and only after components B and A, if appropriate together with components C and F, if these components are present, have been intimately mixed are components D and, if appropriate, E (if component E is present) added, with continuation of the mixing process, and with retention of the mixing temperature above the highest melting or softening point of component A.

In a third variant, component A is used as initial charge and heated to a temperature above the highest melting or softening point of component A, and then component B is added and components A and B are intimately mixed, if appropriate together with components C and F, if these are present. Components D and, if appropriate, E (if component E is present) are then added, with continuation of the mixing process and with retention of the mixing temperature above the highest melting or softening point of component A.

In a fourth variant, all of components A, B, C, D, E, and, if appropriate, F—to the extent that the components are present in the compositions—can be used simultaneously as initial charge at a temperature above the highest melting or softening point of the thermoplastic polymer(s), and can then be intimately mixed.

Particularly good distribution of elastomer component B in the thermoplastic component A is achieved when the process is carried out according to a fifth, particularly preferred, variant. In this, component B is first mixed with components D and, if appropriate, E (to the extent that component E is present), at a temperature below the highest melting or softening point of component A. The temperature below the highest melting or softening point of component A depends on the component A used. It is preferable that the temperature below the highest melting or softening point of component A is from 30 to 180° C., particularly preferably from 50 to 150° C. The mixture obtained is then added to a mixture of component A with components C and F—to the extent that components C and F are present in the compositions of the invention—where these have been heated to a temperature above the highest melting or softening point of component A.

All of the components are then intimately mixed at a temperature above the highest melting or softening point of component A.

The abovementioned variants of the process, in particular variant 5 of the process, maximize the fineness and uniformity of distribution of component A and component B prior to crosslinking of the elastomer phase. A typical particle size of the elastomer particles prior to the crosslinking process is <5 µm.

The temperature mentioned above and hereinafter, above the highest melting or softening point of component A, depends on the component A used. The temperature above the highest melting or softening point of component A is preferably from 150° C. to 350° C., particularly preferably from 200° C. to 300° C.

The selection of the addition time and the temperature, form, and amount of components D and E should moreover be such as to ensure good distribution of component D and, if appropriate, E in the elastomer phase, and that the elastomer phase and thermoplastic phase are present in the state described above, and that the crosslinking of the elastomer phase takes place only thereafter, so that a phase inversion takes place, or a co-continuous phase structure of the elastomers and of the thermoplastic phase arises, and/or that the elastomer is present in dispersed form in the thermoplastic phase with particles <5 µm.

The crosslinkable compositions of the invention have excellent suitability for the provision of thermoplastic elastomers with balanced properties, in particular with very good heat resistance values and solvent resistance values, and at the same time with very good elastic properties, with a wide hardness range.

The present invention therefore also provides a process for the production of thermoplastic elastomers, encompassing the crosslinking of the compositions of the invention, or of compositions prepared according to the process of the invention. To this end, the crosslinkable compositions of the invention are subjected to a continued mixing procedure at a temperature which is above the highest melting or softening point of the component A used. Preferred temperatures above the melting or softening point of component A have been mentioned above.

According to the present invention, dynamic crosslinking takes place. The crosslinking of the disperse elastomer phase therefore takes place during the mixing of components A to F (to the extent that these are present in the mixture). This begins when the process of the invention for the production of the crosslinkable compositions of the invention, in particular a process according to process variants 1 to 5, is continued at a temperature above the melting or softening point of component A in the presence of components D and, if appropriate, E, particularly preferably during process variant 5.

In the mixing procedure for components A, B, C, D, E and F—to the extent that these components are present—for the production of the crosslinkable composition of the invention, a point in the process is reached at which the power consumption in the mixing assembly assumes a constant value. The mixing procedure for the production of the crosslinkable composition has concluded at this juncture, and the crosslinkable composition is present. If necessary, the mixing procedure can be terminated here, and the crosslinkable compositions can be obtained by quenching, i.e. by lowering the temperature, and—if desired—can be isolated. If the mixing procedure is continued, either immediately or after interruption as described, the crosslinking process takes place via components D and, if appropriate, E, and this is discernible in an increase in the power consumption of the mixing assembly. Dynamic crosslinking of elastomeric component B is involved here.

After phase inversion or formation of a co-continuous phase, the crosslinked product obtained, i.e. the thermoplastic elastomer, is generally cooled to a temperature below the melting or softening point of the thermoplastic polymer(s).

The present invention also provides thermoplastic elastomers obtainable via crosslinking of the crosslinkable compositions of the invention. Suitable crosslinking processes for the production of the elastomers of the invention, and also suitable crosslinkable compositions, have been mentioned above.

The invention further provides, in a first embodiment, thermoplastic elastomers comprising
a) from 5 to 50% by weight, preferably from 10 to 40% by weight, particularly preferably from 10 to <30% by weight, of at least one polyamide, as component A;
b) as component B', from 20 to 95% by weight, preferably from 40 to 89.5% by weight, particularly preferably from >55 to 85% by weight, of at least one α-olefin-vinyl acetate copolymer which has been crosslinked via at least one free-radical crosslinking initiator in combination with at least one co-crosslinking agent;
c) from 0 to 30% by weight, preferably from 0.5 to 20% by weight, particularly preferably from 5 to 15% by weight, of filler materials, plasticizers, additives and/or additions, as component C;
where the entirety of components A, B and C is 100% by weight.

In a second embodiment, the present invention provides thermoplastic elastomers comprising
a) from 10 to <30% by weight, preferably from 10 to 25% by weight, of at least one polyamide, as component A;
b) as component B", from >50 to 90% by weight, preferably from 60 to 89.5% by weight, of at least one α-olefin-vinyl acetate copolymer which has been crosslinked via at least one free-radical crosslinking initiator, if appropriate in combination with at least one co-crosslinking agent;
c) from 0 to 20% by weight, preferably from 0.5 to 15% by weight, of filler materials, plasticizers, additives and/or additions, as component C;
where the entirety of components A, B and C is 100% by weight.

A feature of the thermoplastic elastomers according to the present invention is that elastomer component B is present in finely dispersed form in the thermoplastic component A. The thermoplastic elastomers according to the present invention feature very good heat resistance and very good solvent resistance at the same time as very good elastic properties in a low hardness range (Shore hardness A). They also have excellent physical and dynamic properties, for example excellent compression set, at high temperatures markedly above 150° C., these being the temperatures especially demanded in automobile construction. Once the thermoplastic phase has melted, the entire system becomes thermoplastically processable, thus complying with the necessary preconditions for a thermoplastic elastomer.

The present invention therefore further provides the use of the compositions of the invention according to embodiment 1 or 2 for the production of thermoplastic elastomers, and also the use of the thermoplastic elastomers of the invention according to embodiment 1 or 2 for the production of mouldings, preferably drive belts, gaskets, sleeves, hoses, membranes, dampers, profiles, or cable sheathing, hot-melting adhesives, or foils, or for plastics-rubber coextrusion, or for co-injection-moulding.

The present invention further provides mouldings, cable sheathing, hot-melt adhesives or foils comprising the thermoplastic elastomers of the invention.

Suitable components of the crosslinkable compositions of the invention and of the thermoplastic elastomers of the invention have been mentioned above, as also have suitable preparation processes for the preparation of the crosslinkable compositions of the invention, and production processes for the production of the thermoplastic elastomers of the invention.

The mouldings obtained feature excellent physical properties, in particular excellent elasticity values with a wide hardness range, in particular in a low hardness range, and also feature resistance to high temperatures and solvent resistance, in particular oil resistance. These properties are of great importance in particular for hoses, drive belts, membranes, gaskets, bellows, cable sheathing, hot-melt adhesives, foils and sleeves, for example for automobile applications and other industrial applications. The mouldings can by way of example be produced in a simple manner in a single-stage process.

The examples below provide additional explanation of the invention.

EXAMPLES

General Process Specification for the Production of the Thermoplastic Elastomers An internal mixer from Werner and Pfleiderer with 1.5 l mixing volume is preheated to a chamber temperature of 180° C. The rubber (ethylene-vinyl acetate copolymer) and all of the additives inclusive of co-crosslinking agent—to the extent that a co-crosslinking agent is used—but with the exception of the crosslinking system, peroxide, are used as initial charge and mixed at a rotation rate of 100 rpm in the internal mixer for 1 min. The thermoplastic used in accordance with the examples below with a melting point of from 210° C. to 220° C. is now charged to the internal mixer. At a rotation rate of from 130 to 150 rpm, the temperature in the internal mixing process rises to a temperature of from 230° C. to 250° C. within a period of 2 min. This temperature is above the temperature of the melting point of the thermoplastic. The thermoplastic is fully melted. The rubber and thermoplastic components are intimately mixed in the melt by further mixing at this temperature for 3 min. The desired particle size of <5 μm, homogeneous dispersion of the two components, and a co-continuous phase morphology are achieved in this section of the mixing process. Once the 3 minutes have concluded, the crosslinking system is added. Given suitable peroxides with high crosslinking temperature, this takes place either directly or alternatively in a precompounded material, with premixing of the peroxide in a small amount of the rubber on a roll prior to addition to the internal mixer. The dynamic crosslinking of the rubber phase takes place in the internal mixer during the mixing time of 3 minutes at a temperature of from 230° C. to 250° C. at a rotation rate of 150 rpm. The contents of the internal mixer are discharged and, while still hot, roll-milled as quickly as possible on a roll to give a milled sheet. Test sheets are then cut out from this and are pressed for 10 min at temperatures of 250° C., above the melting point of the TPE, which is 220° C. The thickness of the test sheets is 2 mm or 6 mm, depending on the subsequent tests. All of the subsequent tests are carried out on these sheets. Tensile strain and stress are tested on 2 mm sheets and compression set is tested on 6 mm sheets.

The tables below specify the components used in the examples: thermoplastic, rubber, additives and co-crosslinking agents. The amounts used are stated in the tables below in parts by weight unless otherwise mentioned.

Table 1 collates the physical properties of three thermoplastic elastomers of the invention (Example 1, Example 3 and Example 4) and of a thermoplastic elastomer not of the invention, as Comparative Example (Example 2(comp.)):

TABLE 1

| Formulation (Parts by wt.) | | Example 1 | Example 2 (comp.) | Example 3 | Example 4 |
|---|---|---|---|---|---|
| EVM rubber | Levapren 600[1)] | | | 100 | 100 |
| | Levapren 700[2)] | 100 | 100 | | |
| | Durethan B 31 SK[3)] | 40 (27% by wt.) | 50 (32% by wt.) | 40 | 40 |
| Filler | Aerosil R 972[4)] | | | 20 | 20 |
| Peroxide | Trigonox 311[5)] | 1 | 1 | 1 | 1 |
| Co-agent | TAIC[6)] | | | 1.5 | |
| Additives | Maglite DE[7)] | 2 | 2 | 2 | 2 |
| | Rhenogran PCD 50[8)] | 3 | 3 | 3 | 3 |
| Properties | | | | | |
| | Stress (MPa) (ISO 37) | 6.3 | 6.2 | 9.4 | 6.5 |
| | Shore A hardness (DIN 53505, ISO 868) | 78.2 | 88.6 | 91.8 | 79 |
| | Compression set (125° C., 24 h, 25%) (ISO 815) | 77 | 87.6 | 71.8 | 81 |
| | Compression set (150° C., 24 h, 25%) (ISO 815) | 72 | 88.2 | 69.4 | 85 |

[1)]Levapren ® 600: ethylene-vinyl acetate copolymer having 60 ± 1.5% by wt. of vinyl acetate from Lanxess Deutschland GmbH
[2)]Levapren ® 700: ethylene-vinyl acetate copolymer having 70 ± 1.5% by wt. of vinyl acetate from Lanxess Deutschland GmbH
[3)]Durethan B 31 SK: nylon-6 from Lanxess Deutschland GmbH
[4)]Aerosil R972: hydrophobicized fumed silica from Evonik Degussa
[5)]Trigonox ® 311: 3,3,5,7,7-pentamethyl-1,2,4-trioxepane from Akzo Nobel Chemicals
[6)]TAIC: DIAK 7 triallyl isocyanurate from DuPont
[7)]Maglite ® DE: magnesium oxide from CP Hall Co
[8)]Rhenogran PCD 50: polycarbodiimide from Rhein Chemie Rheinau GmbH Comparison of Example 1 and Comparative Example 2 (comp.) shows that compression set is substantially lower in the thermoplastic elastomers of the invention than in the thermoplastic elastomers according to the comparative example, but with no (substantial) impairment of the other physical properties of stress and hardness.

Comparison of Examples 3 and 4 of the invention shows that compression set can be substantially reduced via addition of a co-crosslinking agent (TAIC), without any (substantial) impairment of the other physical properties of stress and hardness.

The additives mentioned in the abovementioned examples are not essential in the thermoplastic elastomers, and serve to improve their processability. They do not have any substantial effect on the physical properties mentioned in Table 1 above.

Table 2 collates the physical properties of two thermoplastic elastomers of the invention with various compatibilizers (Examples 5 and 6):

TABLE 2

| Formulation (parts by weight) | | Example 5 | Example 6 |
|---|---|---|---|
| EVM rubber | Levapren 600[1)] | 95 | 95 |
| MAH_g EVM | MAH_g_Lev 600[2)] | 5 | |
| MAH_g EVA | Fusabond MC250D[3)] | | 5 |
| Nylon-6 | Durethan B 31 SK[4)] | 40 (27% by wt.) | 40 (27% by wt.) |
| Peroxide | Trigonox 311[5)] | 1 | 1 |
| Additives | Maglite DE[6)] | 2 | 2 |
| | Rhenogran PCD 50[7)] | 3 | 3 |
| Properties | Tensile strain and hardness | | |
| | Tensile strain (%) (ISO 37) | 221 | 233 |
| | Stress (MPa) (ISO 37) | 5.1 | 5.2 |
| | Shore A hardness (DIN 53505, ISO 868) | 81 | 73 |
| | Compression set (125° C., 24 h, 25%) (ISO 815) | 81.5 | 86.1 |
| | Compression set (150° C., 24 h, 25%) (ISO 815) | 84.7 | 86.8 |
| | Swelling (%) volume, engine oil for 24 h at 125° C. (ISO 1817) | 21.95 | 29.68 |

[1)]Levapren ® 600: ethylene-vinyl acetate copolymer having 60 ± 1.5% by wt. of vinyl acetate from Lanxess Deutschland GmbH
[2)]MAH_g_Lev 600: Levapren ® 600, grafted with maleic anhydride; prepared by analogy with Example 1 (process step 1 in EP 1 801 162 A1)
[3)]Fusabond MC250D: ethylene-vinyl acetate copolymer having 28% by wt. of vinyl acetate, from DuPont
[4)]Durethan B 31 SK: nylon-6 from Lanxess Deutschland GmbH
[5)]Trigonox ® 311: 3,3,5,7,7-pentamethyl-1,2,4-trioxepane from Akzo Nobel Chemicals
[6)]Maglite ® DE: magnesium oxide from CP Hall Co
[7)]Rhenogran PCD 50: polycarbodiimide from Rhein Chemie Rheinau GmbH Comparison of Examples 5 and 6 shows that the swelling of the thermoplastic elastomers of the invention in engine oil is substantially smaller when a compatibilizer based on EVM (ethylene-vinyl acetate copolymer) having high vinyl acetate content, 60% by weight, in Example 5, is used. The thermoplastic elastomers according to Example 6, in which a compatibilizer based on EVA having vinyl acetate content of 28% by weight of vinyl acetate is used, likewise exhibit a good property profile, but swelling in engine oil is moderate, and higher than in Example 5.

What is claimed is:

1. A crosslinkable composition comprising
    a) from 10 to <30% by weight of at least one polyamide, as component A;
    b) from >50 to 90% by weight of at least one α-olefin-vinyl acetate copolymer having a vinyl acetate content of ≧40% by weight, as component B;
    c) from 0 to 20% by weight of filler materials, plasticizers, additives and/or additions, as component C;
    where the entirety of components A, B and C is 100% by weight, and
    d) from 1 to 6 parts by weight per 100 parts by weight of the α-olefin-vinyl acetate copolymer (phr) of at least one free-radical crosslinking initiator, as component D; and
    e) from 1 to 6 parts by weight per 100 parts by weight of the α-olefin-vinyl acetate copolymer (phr) of at least one co-crosslinking agent, as component E.

2. The crosslinkable composition according to claim 1 comprising
    a) from 10 to 25% by weight, of at least one polyamide, as component A;
    b) from 60 to 89.5% by weight of at least one α-olefin-vinyl acetate copolymer, as component B;
    c) from 0.5 to 15% by weight, of filler materials, plasticizers, additives and/or additions, as component C;
    where the entirety of components A, B and C is 100% by weight, and
    d) from 1 to 6 parts by weight per 100 parts by weight of the α-olefin-vinyl acetate copolymer (phr) of at least one free-radical crosslinking initiator, as component D; and
    e) from 1 to 6 parts by weight per 100 parts by weight of the α-olefin-vinyl acetate copolymer (phr) of at least one co-crosslinking agent, as component E.

3. The composition according to claim 1, wherein the polyamide used comprises a polyamide based on $C_6$-$C_{12}$ lactams or ω-aminocarboxylic acids having from 4 to 18 carbon atoms, or a polycondensate, obtainable from the polycondensation of at least one diamine from the group consisting of aliphatic diamines having from 4 to 18 carbon atoms and of cycloaliphatic diamines having from 7 to 22 carbon atoms, with at least one dicarboxylic acid selected from the group consisting of aliphatic dicarboxylic acids having from 4 to 44 carbon atoms, of cycloaliphatic dicarboxylic acids having from 8 to 24 carbon atoms, and of aromatic dicarboxylic acids having from 8 to 20 carbon atoms.

4. The composition according to claim 1, wherein the polyamide used has been selected from the group consisting of polycaprolactam, polylaurolactam, polyhexamethyleneadipamide, polyhexamethyleneazelamide, polyhexamethylenesebacamide, polyhexamethyleneisophthalamide, polyamino-undecanoic acid, polytetramethyleneadipamide, copolymers of caprolactam, hexamethylenediamine and adipic acid, and aramids such as polypara-phenyleneterephthalamide.

5. The composition according to claim 1, wherein the α-olefin-vinyl acetate copolymer is an α-olefin-vinyl acetate copolymer with vinyl acetate content of ≧50% by weight.

6. The composition according to claim 1, wherein the α-olefin-vinyl acetate copolymer is an ethylene-vinyl acetate copolymer.

7. The composition according to claim 1, wherein the free-radical crosslinking initiators used comprise peroxides.

8. The composition according to claim 1, wherein the free-radical crosslinking initiators used comprise peroxides which have crosslinking temperatures of ≧175° C.

9. The composition according to claim 1, wherein the free-radical crosslinking initiators used comprise peroxides which have crosslinking temperatures of ≧180° C.

10. The composition according to claim 1, wherein the free-radical crosslinking initiators used comprise peroxides which have crosslinking temperatures of ≧185° C.

11. The composition according to claim 1, wherein the co-crosslinking agent is selected from the group consisting of triallyl isocyanurate, N,N'-m-phenylenedimaleimide, triallyl cyanurate, liquid polybutadiene, trimethylolpropane-N,N'-m-phenylenemaleimide, N-methyl-N,N'-m-phenylenedimaleimide, divinylbenzene, polyfunctional methacrylate monomers, and polyfunctional vinyl monomers.

12. The composition according to claim 1, wherein the composition also comprises at least one compatibilizer, as component F.

13. The composition according to claim 12, where the compatibilizer F is selected from the group consisting of a copolymer based on an α-olefin-vinyl acetate copolymer as main polymer chain, functionalized with carboxy groups, carbonyl groups, halogen atoms, amino groups, hydroxy groups or oxazoline groups, and a combination of at least one phenolic resin with at least one Cl-containing Lewis acid.

14. The composition according to claim 13, wherein the compatibilizer is a copolymer based on an α-olefin-vinyl acetate copolymer as main polymer chain, functionalized with carboxy groups, where the compatibilizer is obtained by means of grafting of α,β-ethylenically unsaturated mono- and/or dicarboxylic acids or their derivatives onto a main chain provided by an α-olefin-vinyl acetate copolymer.

15. A process for the preparation of the composition according to claim 12 comprising mixing of components A, B, C, D, E and F which have been heated to temperatures above the highest melting point or softening point of component A.

16. A process for the preparation of thermoplastic elastomers comprising the crosslinking of compositions according to claim 12, or prepared according to claim 15 wherein the crosslinking of the disperse elastomer phase takes place during the mixing of components A to F.

17. A thermoplastic elastomer obtainable via crosslinking of compositions according to claim 1 or 12.

18. A thermoplastic elastomer comprising
    a) from 10 to <30% by weight of at least one polyamide, as component A;
    b) as component B", from >50 to 90% by weight of at least one α-olefin-vinyl acetate copolymer which has been crosslinked via at least one free-radical crosslinking initiator, if appropriate in combination with at least one co-crosslinking agent;
    c) from 0 to 20% by weight of filler materials, plasticizers, additives and/or additions, as component C;
    where the entirety of components A, B and C is 100% by weight.

19. The thermoplastic elastomer according to claim 18 in the form of or as part of drive belts, gaskets, sleeves, hoses, membranes, dampers, profiles, cable sheathing, hot-melting adhesives, foils, plastics-rubber coextruded articles, or for co-injection-mouldings.

* * * * *